US010140408B2

(12) United States Patent
Mandyam (10) Patent No.: US 10,140,408 B2
(45) Date of Patent: Nov. 27, 2018

(54) SELECTIVELY ENCRYPTING CONTENT FOR DISTRIBUTION FROM A RECEIVER DEVICE TO A COMPANION DEVICE (71) Applicant: QUALCOMM Incorporated, San Diego, CA (US)

(72) Inventor: Giridhar Dhati Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 14/845,572

(22) Filed: Sep. 4, 2015

(65) Prior Publication Data
US 2017/0070482 A1    Mar. 9, 2017

(51) Int. Cl.
G06F 21/00 (2013.01)
G06F 17/50 (2006.01)

(52) U.S. Cl.
CPC ........ *G06F 17/5072* (2013.01); *G06F 17/505* (2013.01); *G06F 17/5022* (2013.01); *G06F 17/5045* (2013.01); *G06F 17/5068* (2013.01)

(58) Field of Classification Search
CPC ........................... G06F 21/10; H04L 2463/101
USPC .................. 726/26–27, 30; 713/151; 705/51
See application file for complete search history.

(56) References Cited

U.S. PATENT DOCUMENTS

| 7,770,229 | B2 | 8/2010 | Upendran |
| 8,000,474 | B1 | 8/2011 | Evans et al. |
| 8,166,499 | B2 | 4/2012 | Stone et al. |
| 8,825,551 | B2 | 9/2014 | Peterka et al. |
| 2005/0169473 | A1 | 8/2005 | Candelore |
| 2007/0079381 | A1 | 4/2007 | Hartung et al. |
| 2007/0169203 | A1 | 7/2007 | Kim et al. |
| 2011/0004669 | A1* | 1/2011 | Navar et al. ............ G06F 21/10 |
| 2011/0055090 | A1* | 3/2011 | Ross ...................... G06F 21/10 705/310 |
| 2012/0066493 | A1* | 3/2012 | Widergren ............. G06F 21/10 713/160 |
| 2016/0065567 | A1* | 3/2016 | Aggarwal et al. .......................... H04L 63/0823 |

FOREIGN PATENT DOCUMENTS

WO    2006069967 A1    7/2006

OTHER PUBLICATIONS

International Search Report and Written Opinion—PCT/US2016/039781—ISA/EPO—Feb. 22, 2017.
(Continued)

*Primary Examiner* — Alexander Lagor
(74) *Attorney, Agent, or Firm* — The Marbury Law Group, PLLC (57) ABSTRACT Embodiments include systems and methods for selectively encrypting content for distribution from a receiver device to a companion device. A device processor of the receiving device may receive content, and may determine whether the content is encrypted. The device processor may determine the capabilities of the companion device in response to determining that the content is not encrypted. The device processor may encrypt the content in response to determine that the capabilities of the companion device meet a threshold. The device processor may then send the encrypted content to the companion device.

28 Claims, 6 Drawing Sheets (56) References Cited

OTHER PUBLICATIONS

Su-Wan P., et al., "Efficient DRM Mechanism of Scalable Contents based on H.264/SVC in Convergence Environment," Multimedia Tools and Applications, Kluwer Academic Publishers, Boston, US, Apr. 25, 2013, vol. 73(2), pp. 841-855, XP035404471, ISSN: 1380-7501, DOI: 10.1007/S11042-013-1452-6 [retrieved on Apr. 25, 2013] abstract p. 842, line 6-line 30 section "3.2.4 Content distribution between devices in home domain".
Su-Wan R, et al., "Efficient DRM Mechanism of Scalable Contents based on H.264/SVC in Convergence Environment," Multimedia Tools and Applications, Kluwer Academic Publishers, Boston, US, Apr. 25, 2013, vol. 73(2), pp. 841-855, XP035404471, ISSN: 1380-7501, DOI: 10.1007/S11042-013-1452-6 [retrieved on Apr. 25, 2013] abstract p. 842, line 6-line 30 section "3.2.4 Content distribution between devices in home domain".

\* cited by examiner

SELECTIVELY ENCRYPTING CONTENT FOR DISTRIBUTION FROM A RECEIVER DEVICE TO A COMPANION DEVICE

BACKGROUND

Adaptive bitrate streaming is a technique used in streaming media data (such as video, audio, and other multimedia data) over a communication network. Examples of adaptive bitrate streaming techniques include DASH (Dynamic Adaptive Streaming over HTTP (Hypertext Transfer Protocol)), Adobe Dynamic Streaming for Flash, Apple HTTP Adaptive Streaming, and Microsoft Smooth Streaming. DASH is a streaming standard supporting adaptive streaming using the HTTP protocol. In one variant of DASH, media intervals may be composed of one or more layered chunks, and each additional layered chunk added to a base layer chunk may increase the quality of the media presentation for that media interval. Each media presentation may be encoded using a scalable encoder such that each media interval includes a base layer chunk and one or more enhanced layer chunks. Content data may be streamed from a server to a client application over a wired or wireless communication link so that a portion of the content can be received by the client application and rendered for presentation before all of the content data is received by the client application.

Content data (or simply "content") may be protected from unauthorized viewing, copying, or redistribution using encryption. Various encryption schemes may be used. A commonly-used transport layer encryption scheme, Conditional Access (CA), protects high-value content (e.g., only certain but not all content) in flight between a broadcaster and a receiver device. However, once the content is decoded at the receiver device, the content exists in an unencrypted form and is not protected against copying or redistribution. If unencrypted content is then redistributed from the receiver device to a companion device (e.g., a smartphone or a laptop) in communication with the receiver device, the redistributed content may be vulnerable to copying or redistribution. While it is possible to re-encrypt the high-value content by the receiver after CA is decoded (e.g., by applying Digital Rights Management (DRM) protections or other content encryption), such re-encryption may not be necessary, either because of the companion device already includes systems that prevent content redistribution (such as a Smart TV), or because the content is already encrypted using DRM.

SUMMARY

Various embodiments may include methods for selectively encrypting content for distribution from a receiver device to a companion device in order to provide suitable protections for the content depending upon the capabilities of the companion device. Various embodiments may include determining whether content received by the receiver device is encrypted, determining whether capabilities of the companion device meet a threshold in response to determining that the content is not encrypted, encrypting the content in response to determining that the capabilities of the companion device meet the threshold, and sending the encrypted content to the companion device. In some embodiments, encrypting the content may include encrypting the content using a content-layer encryption scheme.

In some embodiments, determining whether content received by the receiver device is encrypted may include determining whether out-of-band signaling regarding the content is received, and determining whether the out-of-band signaling indicates that the content is encrypted in response to determining that out-of-band signaling is received. Such embodiments may further include sending the content to the companion device in response to determining that the out-of-band signaling indicates the content is encrypted. Such embodiments may further include delaying transmission of the content to the companion device in response to determining that the out-of-band signaling indicates the content is not encrypted, and inspecting the content for encryption. Such embodiments may further include determining based on inspecting the content whether the content is encrypted, and sending the content to the companion device in response to determining that the content is encrypted.

In some embodiments, determining whether capabilities of the companion device meet a threshold comprises determining whether capabilities of the companion device to prevent redistribution of the content meet the threshold. Such embodiments may further include preventing access by the companion device to the content in response to determining that the capabilities of the companion device to prevent redistribution of the content do not meet the threshold.

Further embodiments include a receiver device including a memory, a network interface configured to receive content from a communication network, a communication interface configured to communicate with a companion device, and a processor coupled to the memory, the network interface and the communication interface, and configured with processor executable instructions to perform operations of the methods summarized above. Further embodiments include a receiver device having means for performing functions of the methods summarized above. Further embodiments include a non-transitory processor-readable storage medium having stored thereon processor-executable instructions configured to cause a processor of a receiver device to perform operations of the methods summarized above.

BRIEF DESCRIPTION OF THE DRAWINGS

The accompanying drawings, which are incorporated herein and constitute part of this specification, illustrate exemplary embodiments of various embodiments, and together with the general description given above and the detailed description given below, serve to explain the features of various embodiments.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

Various embodiments enable a processor of a receiver device to selectively encrypt (or re-encrypt) content for distribution to a companion device. In some embodiments, the receiver device may selectively encrypt content for distribution to a companion device in a local network.

The word "exemplary" is used herein to mean "serving as an example, instance, or illustration." Any implementation described herein as "exemplary" is not necessarily to be construed as preferred or advantageous over other implementations.

The term "receiver device" refers to any computing device capable of receiving content data that may be encrypted using a transport-layer encryption scheme (e.g., Conditional Access) and decoding the received (and possibly encrypted) content. The receiver device may also be capable of providing the decoded content to one or more output components, such as a display or a speaker. The receiver device may further be capable of providing the decoded content to one or more companion devices in communication with the receiver device. A receiver device may be a dedicated computing device (for example, a set top box, a gaming device, a computer, a server, or a portable communication device) or a module included in a computing device (e.g., software for executing one or more programs that may cause the computing device to operate as a receiver device).

The term "companion device" refers to any one or all of cellular telephones, smartphones, personal or mobile multimedia players, personal data assistants (PDAs), laptop computers, tablet computers, smartbooks, palmtop computers, wireless electronic mail receivers, multimedia Internet enabled cellular telephones, wireless gaming controllers, personal computers, television set top boxes, televisions, and similar personal electronic devices which include a programmable processor and memory and circuitry for receiving and presenting media content, in particular from a receiver device when the companion devices in communication with the receiver device.

The terms "component," "module," "system," and the like as used herein are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a receiver device or a companion device, and the receiver device or the companion device, may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Content may be protected from unauthorized viewing, copying, or redistribution using encryption. A commonly-used transport layer encryption scheme, Conditional Access (CA), protects high-value content (e.g., only certain but not all content) in flight between a transmitter device and a receiver device. One potential limitation of CA for other such encryption schemes is that once the content is decoded at a receiver device, the content is typically not protected against copying or redistribution. Redistribution of the unencrypted content from the receiver device to a companion device may make the redistributed content vulnerable to copying or redistribution. While it is possible to re-encrypt the high-value content by the receiver after CA is decoded, such re-encryption may not be necessary, and thus may unnecessarily use computing and memory resources of the receiver device.

Various embodiments enable a processor of a receiver device receiving content to selectively encrypt (or re-encrypt) the content for distribution to a companion device depending on the nature of the content and capabilities and functions of the companion device. In some embodiments, the receiver device may selectively encrypt/reencypt content for distribution to a companion device in a local network.

A receiver device may receive content that is designated as high-value content from a variety of sources. For example, the receiver device may receive content that is encrypted using a transport-layer encryption scheme, such as CA. As another example, the receiver device may receive content that is designated as high-value content in a message from a sending device. In some embodiments, the receiver device may receive the content from a sending device (e.g., a content broadcaster) over a wide area network (e.g., the Internet).

The receiver device may also detect a companion device in communication with the receiver device to which content is to be sent. For example, the receiver device may detect the companion device on a local network, or in communication directly (i.e., without intervening network elements) with the receiver device over a wired or wireless communication link.

In various embodiments, the receiver device may determine whether it is necessary for the receiver device to encrypt or re-encrypt the content based on information in or associated with the content or the nature of the content itself. For example, the receiver device may determine whether the content is already encrypted using a content-layer encryption scheme (e.g., DRM). In some embodiments, the receiver device may receive out-of-band signaling (i.e., one or more out-of-band messages, such as the Moving Pictures Expert Group (MPEG) Media Transport signaling) from the sending device that may indicate whether the content is DRM-protected. The receiver device may determine whether the content is encrypted based on that out-of-band signaling.

If out-of-band signaling is received that indicates that the content is encrypted, the receiver device may send the content to the companion device. When no out-of-band signaling is received indicating whether the content is DRM-protected, or in response to determining that the out-of-band signaling indicates that the content not encrypted, the receiver device may delay transmission of the content to the companion device to provide the receiver device time to inspect the content for content-layer encryption. In various embodiments, the receiver device may detect DRM metadata in the content, such as an initialization vector (IVs) or a protection system-specific header. For example, such metadata may remain associated with the content from a DRM implementation such as HTML5 Encrypted Media Extensions (EME) (e.g., an object such as a "MediaEncryptedEvent" object) or an International Organization for Standardization (ISO) Base Media File Format (BMFF) container. If the receiver device determines that the content is encrypted, the receiver device may send the encrypted content to the companion device.

In response to determining that the content is not encrypted, the receiver device may determine the capabilities of the companion device to prevent content redistribution. For example, the receiver device may use information provided by the companion device, such as device identity information, a user agent string, or other information, to determine the capabilities of the companion device. As another example, the receiver device may query the companion device, such as by sending a query to an application programming interface (API) of the companion device, to elicit information to determine the capabilities of the companion device. In some embodiments, the threshold level of capability required of the companion device may include a capability to receive and decode content that is encrypted using a content-layer encryption scheme. In response to determining that the companion device capabilities do meet the threshold, the receiver device may encrypt the content (e.g., using a content-layer encryption scheme), and may send the encrypted content to the companion device. If the receiver device determines that the companion device has protection capabilities that do not meet a threshold level of capability to prevent content redistribution, the receiver device may block delivery of the content to the companion device or otherwise prevent the companion device from accessing the content.

In various embodiments, if the receiver device determines from out-of-band signaling that the content is not encrypted and/or determines from inspection of the content that the content does not have encryption, and determines that the receiver device has sufficient protections against content re-distribution, the receiver device may encrypt the content with a content-layer encryption scheme before transmitting the content to the companion device.

Thus, the receiver device may selectively redistribute the content in an encrypted state if such content protections are required. By selectively encrypting content, the receiver device may protect high-value content from unauthorized copying or redistribution while only expending the processing resources and delaying content delivery when necessary.

Figure 1:
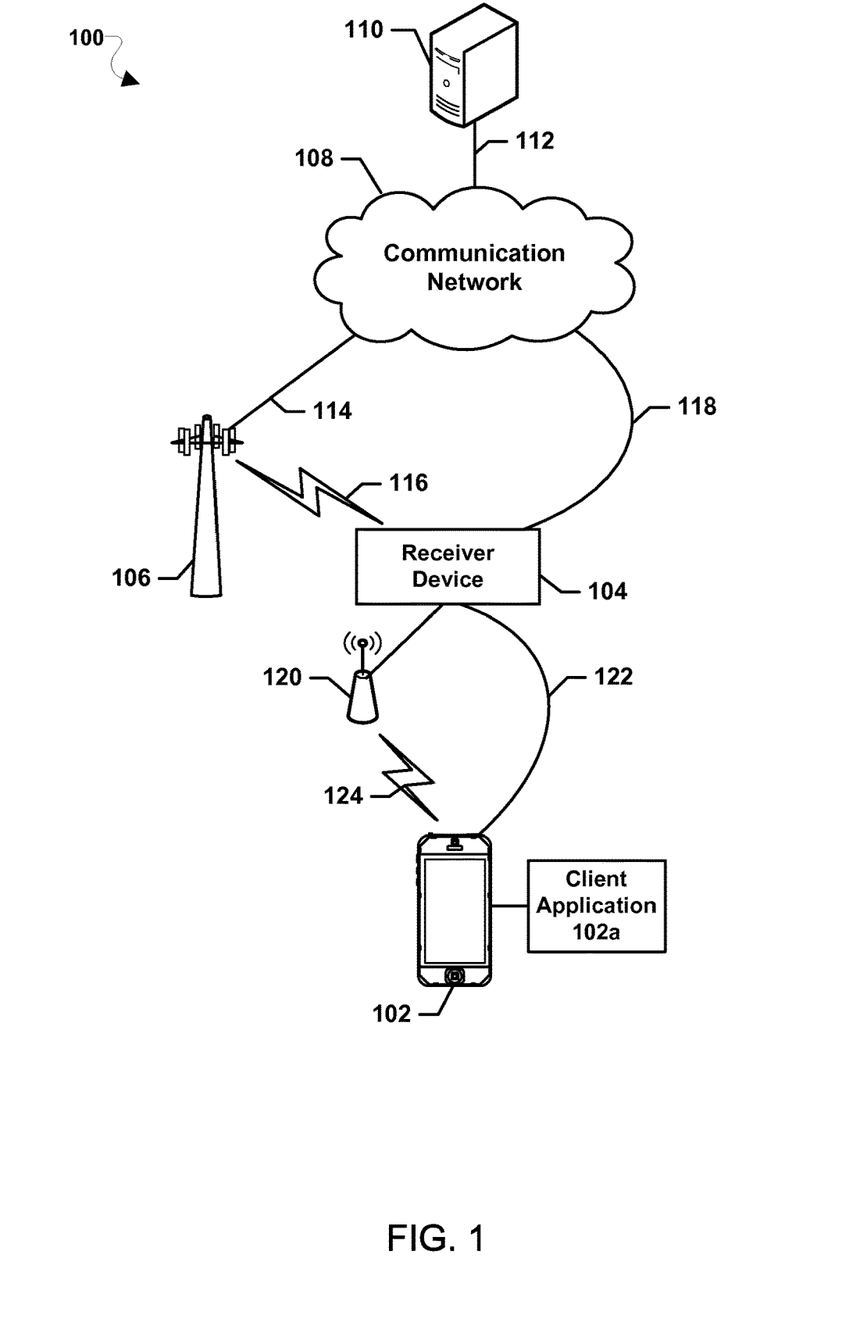
FIG. 1 is a block diagram of communication systems suitable for use with various embodiments.

Various embodiments may be implemented in receiver devices that may operate within a variety of communication systems. FIG. 1 illustrates a communication system 100 suitable for use with various embodiments. A companion device 102 may communicate with a receiver device 104 over a wired communication link 122 or over a wireless communication link 124. The companion device 102 may include a client application 102a that may receive content from the receiver device and render the content for presentation at an output component, such as a screen and/or a speaker. The wired communication link 122 may include any cabling or other physical communication link capable of carrying a signal, which may use one or more communication protocols (e.g., High-Definition Multimedia Interface (HDMI), Sony/Philips Digital Interface Format (SPDIF), or another communication protocol). The receiver device 104 may include a wireless communication component 120 to enable wireless communication with the companion device 102 using one or more communication protocols (e.g., a radio access protocol in the Institute of Electrical and Electronics Engineers (IEEE) 802 family of protocols, such as Wireless Fidelity (Wi-Fi), Bluetooth, or ZigBee, a cellular communication protocol, or another communication protocol). In some embodiments, the receiver device 104 may include an Advanced Television Systems Committee (ATSC) 3.0 receiver device. Non-limiting examples of the receiver device 104 include a cable set-top box (STB) and a Smart TV.

The receiver device 104 may communicate with the communication network 108 over a wired communication link 118 or over a wireless communication link 116. The communication network 108 may include one or more base stations 106 to facilitate wireless communication. The base station 106 may communicate with the communication network 108 over a wired or wireless communication link 114, which may include fiber optic backhaul links, microwave backhaul links, and other communication links. In some embodiments, the communication network 108 may include a content distribution network, mobile telephony communication network, or another type of communication network. The communication network 108 may support communications using one or more radio access technologies, and the wireless communication link 116 may include cellular connections that may be made through two-way wireless communication links using one or more radio access technologies. Examples of radio access technologies may include 3GPP Long Term Evolution (LTE), Worldwide Interoperability for Microwave Access (WiMAX), Code Division Multiple Access (CDMA), Time Division Multiple Access (TDMA), Wideband CDMA (WCDMA), Global System for Mobility (GSM), a radio access protocol in the IEEE 802 family of protocols, ATSC 3.0, Digital Video Broadcasting—Second Generation Terrestrial (DVB-T2), and other radio access technologies for communication protocols. While the communication link 116 is illustrated as a single link, each of the communication links may include a plurality of frequencies or frequency bands, each of which may include a plurality of logical channels. The wired communication link 118 may include one or more of coaxial, fiber optic, twisted pair, data cabling, or another tangible communication link.

The receiver device 104 may receive content via the communication network 108 from a content provider, such as the content server 110. The content server 110 may communicate with the communication network over a wired or wireless communication link 112. The content server 110 may include an application server, a media server, or another network node or network element configured to provide content data, such as video, audio, or multimedia content, for the client application 102a on the companion device 102. The receiver device 104 may send requests for content to the content server 110 over the communication network 108. In response, the content server 110 may stream the requested content data to the receiver device 104 via the communication network 108. The receiver device 104 may be configured to receive the content, and may be further configured to transmit the content to the companion device 102. Thus, content may pass through an intermediate hop via the receiver device 104 before the arriving at the companion device 102. The transmission of the content from the receiver device 104 to the companion device 102 may be referred to as "redistribution" of the content.

Figure 2:
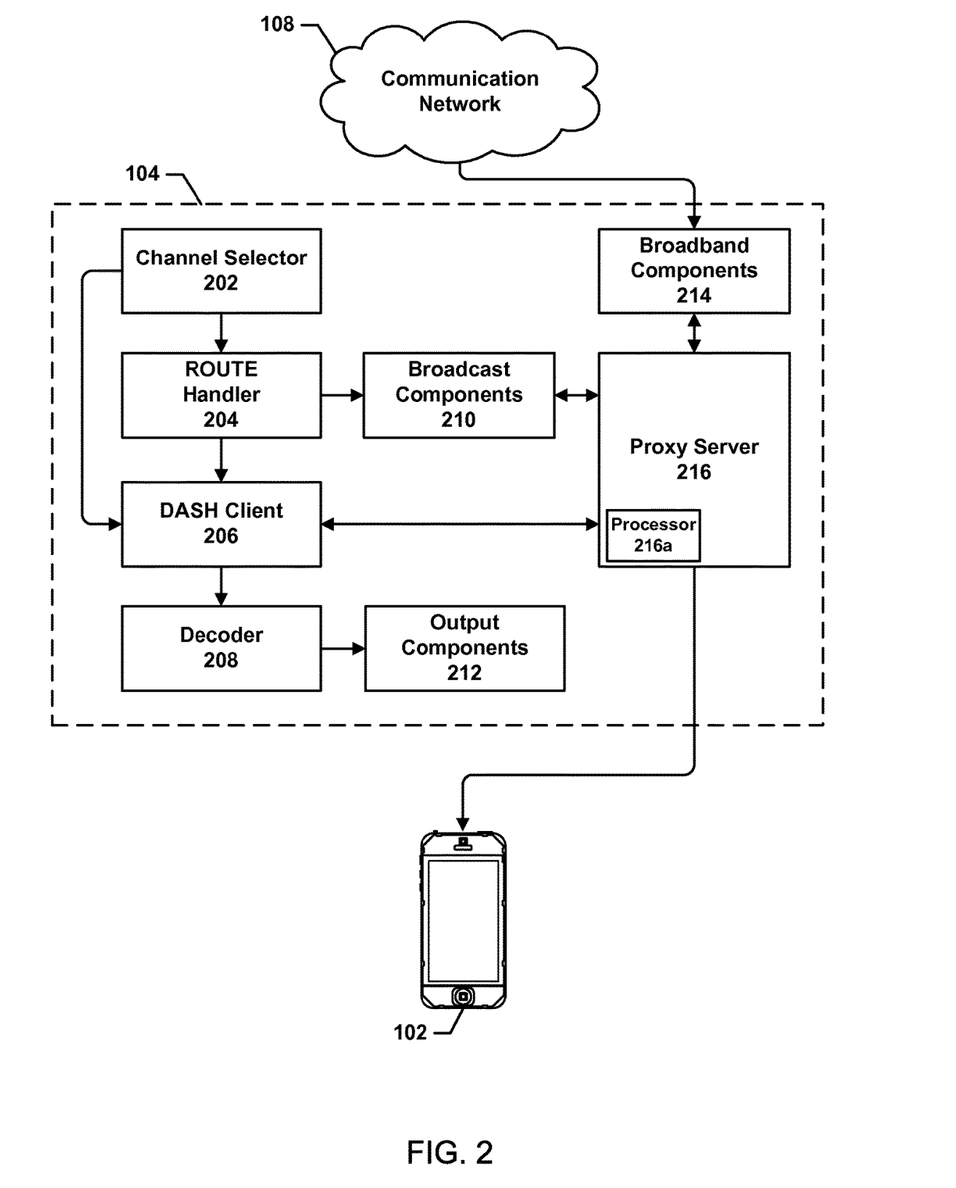
FIG. 2 is a block diagram of a receiver device suitable for use with various embodiments.

FIG. 2 illustrates a block diagram of a receiver device in a communication system suitable for use with various embodiments. With reference to FIGS. 1-2, the receiver device 104 may include a channel selector 202, a Real-Time Object Delivery Over Unidirectional Transport (ROUTE) handler 204, a DASH client 206, a decoder 208, broadcast components 210, output components 212, network interface broadband components 214, a proxy server 216, and memory 220. The proxy server 216 may include a processor 216a that may be configured to execute processor-executable instructions for, among other things, selectively encrypting content for distribution from the receiver device 104 to a companion device (e.g., the companion device 102).

The channel selector 202 may receive a channel selection message or an indication of desired content, and may send a message including information about the selected channel or the indication of desired content to the ROUTE handler 204. The ROUTE handler 204 may receive the message including information about the selected channel or desired content. The ROUTE handler 204 may send one or more messages to the broadcast components 210 to, among other things, instruct the joining of a ROUTE session, provide the information about the selected channel or desired content, provide information regarding sessions to locate certain media and/or a media presentation description (MPD) or other media description, or to instruct extraction of a media payload (i.e., of the desired content). The broadcast components 210 may receive such messages from the ROUTE handler 204 and send related instructions to the proxy server 216.

The proxy server 216 may send instructions related to the selected channel and/or desired content to the broadband components 214, and the broadband components 214 may send instructions to the communication network 108 (e.g., to the content server 110 via the communication network 108) via a network interface (included in 214) in order to obtain the selected channel and/or desired content. The broadband components 214 may receive the content from the communication network 108, and may provide the received content to the proxy server 216. In some cases, the broadband components 214 may also receive out-of-band signaling from the content server 110 that may indicate whether the content is encrypted, for example, at a content level (e.g., using a content-layer encryption scheme). In some embodiments, the out-of-band signaling may include ATSC 3.0 out-of-band signaling.

The proxy server 216 may decrypt content that is encrypted, and provide the decrypted content to the DASH client 206. The DASH client 206 may, among other things, extract from the content media segments one or more MPDs and other information to render the content for presentation. The DASH client 206 may provide the content and such information to render the content to the decoder 208. The decoder 208 may, among other things, render the content for presentation and provide the rendered content to one or more output components 212. The output components 212 may include circuitry that sends a signal to, for example, a display, speaker, or any combination thereof, that may be external to the receiver device 104 (e.g., as may be performed by a set-top box). The output components 212 may also include a display, speaker, or any combination thereof (e.g., as may be performed by a Smart TV).

The proxy server 216 may also include a communication interface 218 for interfacing with one or more companion devices 102, and the proxy server 216 may be configure to provide content to the companion device(s) 102. In various embodiments, the proxy server 216 may be further configured to selectively encrypting content for distribution to the one or more companion devices 102.

The memory 220 may be coupled to the proxy server 216

Figure 3:
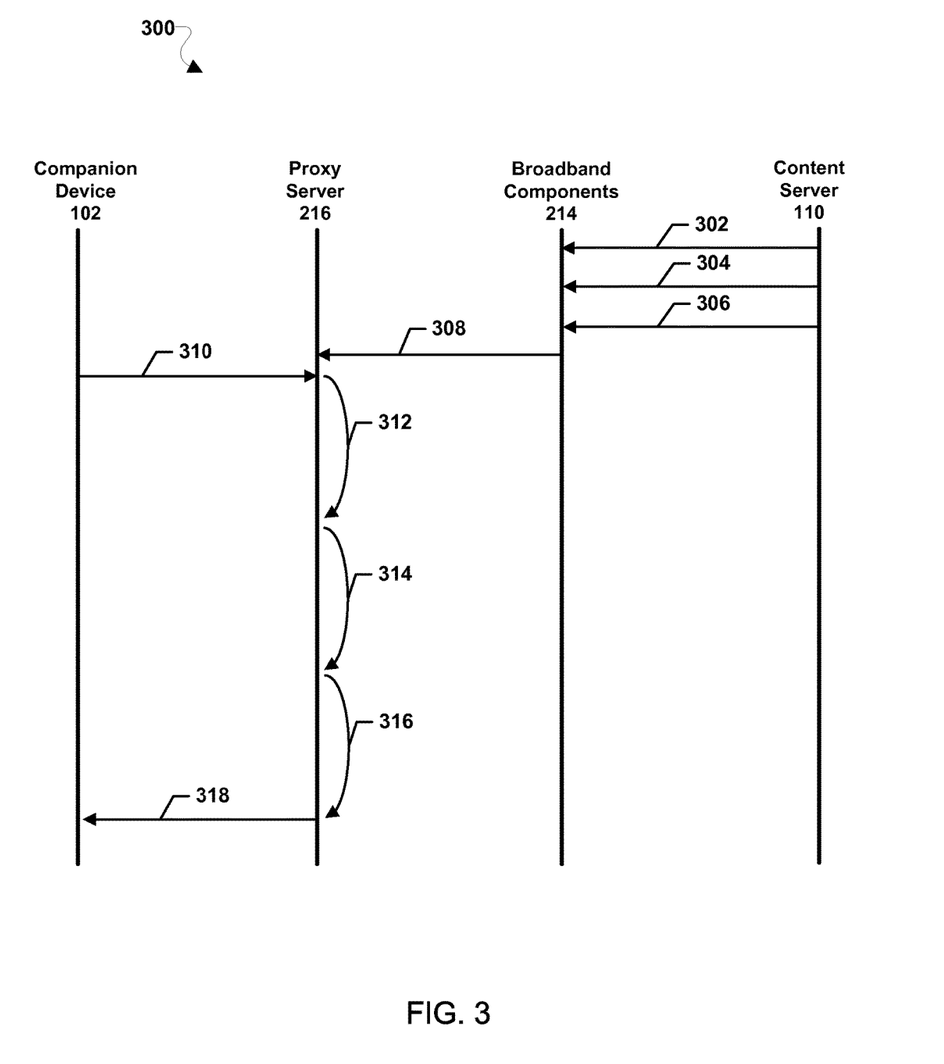
FIG. 3 is a data flow diagram of a method for selectively encrypting content for distribution from a receiver device to a companion device according to various embodiments.

FIG. 3 is a data flow diagram 300 illustrating data flows for selectively encrypting content for distribution from a receiver device to a companion device according to various embodiments. With reference to FIGS. 1-3, the broadband components 214 may receive content 302 (e.g., from the content server 110). The broadband components 214 may also receive (e.g., from the content server 110) out-of-band signaling 304 that may indicate whether the received content is encrypted. The broadband components 214 may further receive an indication 306 (e.g., from the content server 110) that the content is designated as high-value content. For example, the content may be encrypted using a transport-layer encryption scheme, for example, Conditional Access. The broadband components 214 and/or the proxy server 216 may interpret the encryption of the content using the transport-layer encryption as an indication that the content is designated high-value content. As another example, the content may include information that designates the content as high-value content. As a further example, the broadband components 214 and/or the proxy server 216 may receive information (e.g., from the content server 110) designating the content as high-value content.

In message 308, the broadband components 214 may provide to the proxy server 216 the received content, any out-of-band signaling that has been received, and/or any indication that the content is designated as high-value content. The companion device 102 may send to the proxy server 216 a request 310 for the content. In various embodiments, the companion device 102 may request that the proxy server 216 redistribute to the companion device 102 content that is being received by the proxy server 216 (e.g., via the communication network 108).

The proxy server 216 may determine whether the content is encrypted in operation 312, such as using a content-layer encryption scheme. The proxy server 216 may also determine whether capabilities of the companion device to protect the content against redistribution beyond the companion device meet a threshold level of capability in operation 314. In response to determining that the content is not encrypted using the content-layer encryption scheme, and that the capabilities of the companion device to protect the content against redistribution meet the threshold, the proxy server 216 may encrypt the content using the content-layer encryption scheme in operation 316. The proxy server 216 may then send the encrypted content 318 to the companion device.

Figure 4:
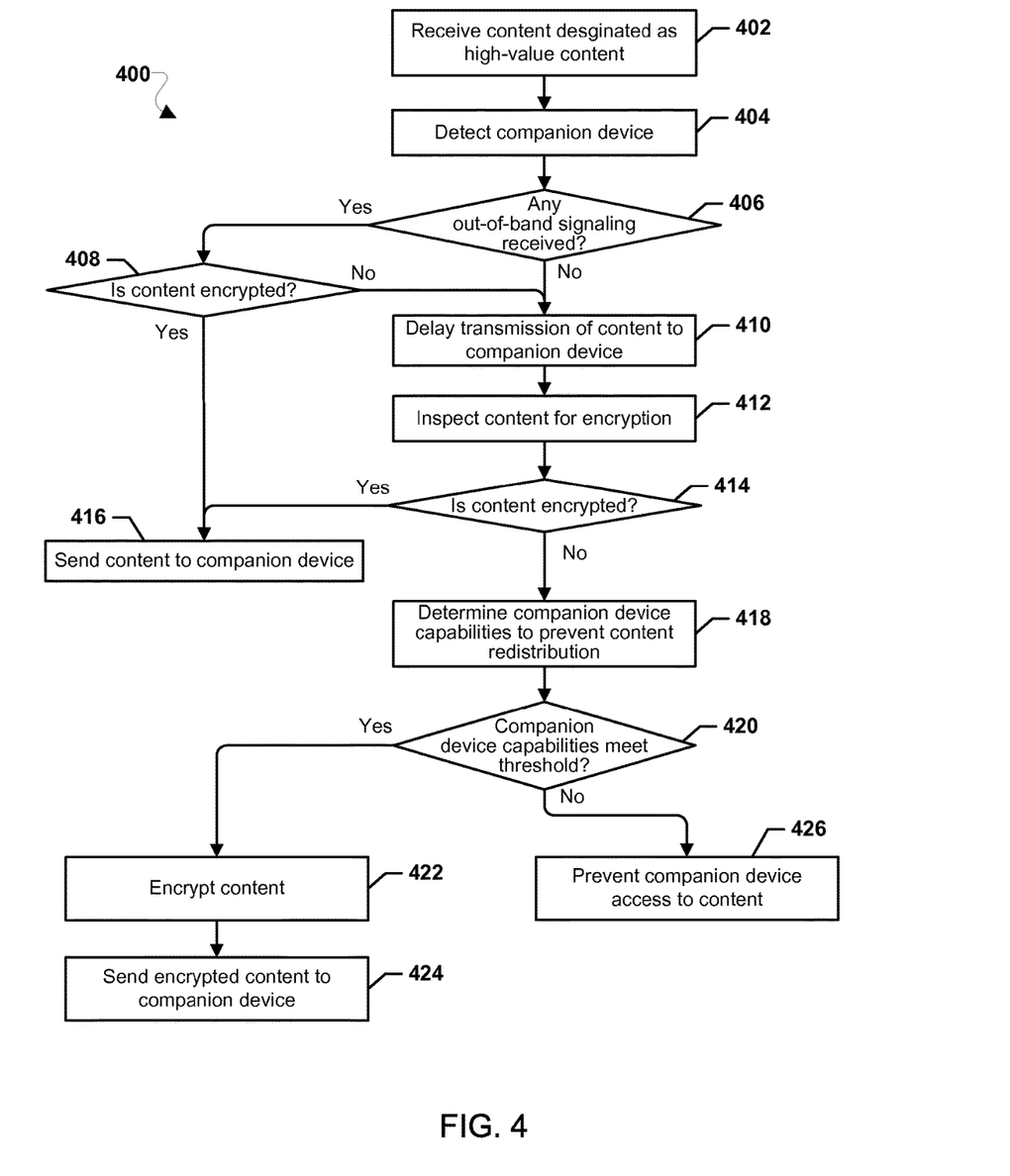
FIG. 4 is a process flow diagram illustrating a method for selectively encrypting content for distribution from a receiver device to a companion device according to various embodiments.

FIG. 4 illustrates a method 400 for selectively encrypting content for distribution from a receiver device (e.g., the receiver device 104 in FIG. 1) to a companion device (e.g., the companion device 102 in FIG. 1) according to various embodiments. With reference to FIGS. 1-4, the method 400 may be implemented by processor of a proxy server (e.g., the processor 216a of the proxy server 216) in the receiver device 104 (i.e., a device processor).

In block 402, the device processor may receive content, such as from a communication network 108. In some embodiments, the device processor may receive an indication (e.g., from the content server 110) that the content is designated as high-value content. For example, the content may be encrypted using a transport-layer encryption scheme (e.g., Conditional Access), and the device processor may interpret the encryption of the content using the transport-layer encryption as an indication that the content is designated high-value content. As another example, the content may include information that designates the content as high-value content. As a further example, the device processor may receive information (e.g., from the content server 110) designating the content as high-value content.

In block 404, the device processor may detect a companion device. For example, the device processor may detect the establishment of a communication link (which may be wired or wireless) between the receiver device (e.g., the receiver device 104) and the companion device (e.g., the companion device 102). As another example, the device processor may receive a request for content from the companion device and the device processor may detect the companion device based on the received request for the content.

In determination block 406, the device processor may determine whether the device processor has received any out-of-band signaling. For example, the device processor may determine whether the device processor has received receive out-of-band signaling (e.g., from the content server 110) that may indicate whether the received content is encrypted. In some embodiments, the out-of-band signaling may indicate whether the content is encrypted using a content-level encryption scheme.

In response to determining that the device processor has received out-of-band signaling (i.e., determination block 406="Yes"), the device processor may determine whether the content is in encrypted in determination block 408. In response to determining that the content is encrypted (i.e., determination block 408="Yes"), the device processor may send the content to the companion device in block 416.

In response to determining that the content is not encrypted (i.e., determination block 408="No") or in response to determining that the device processor has not received any out-of-band signaling (i.e., determination block 406="No"), the device processor may delay transmission of the content to the companion device in block 410, and inspect the content for encryption in block 412. In some embodiments, the receiver device may inspect the content for content-layer encryption. For example, the receiver device may detect DRM metadata in the content, such as an initialization vector (IVs) or a protection system-specific header. Such metadata may remain associated with the content from a DRM implementation such as HTML5 EME (e.g., an object such as a "MediaEncryptedEvent" object) or an ISO BMFF container.

Based on the inspecting of the content, the device processor may determine whether the content is encrypted in determination block 414, such as using a content-layer encryption scheme. In response to determining that the content is encrypted (i.e., determination block 414="Yes"), the device processor may send the content to the companion device in block 416.

In response to determining that the content is not encrypted (i.e., determination block 414="No"), the device processor may determine the capabilities of the companion device to prevent content redistribution in block 418. For example, using information provided by the companion device, such as device identity information, a user agent string in a request for the content, or other information, the receiver device may determine the capabilities of the companion device. In some embodiments, the device processor may use the device identity information to look up the capabilities of the companion device, e.g., from a lookup table, a database, or another data structure. As another example, the receiver device may query the companion device to request information to determine the capabilities of the companion device, such as by sending a query to an application programming interface (API) of the companion device.

In determination block 420, the device processor may determine whether the capabilities of the companion device (i.e., to prevent redistribution of the content) meet a threshold.

In response to determining that the capabilities of the companion device to prevent redistribution of the content meet the threshold (i.e., determination block 420="Yes"), the device processor may encrypt the content in block 422. In some embodiments, the device processor may encrypt the content using a content-level encryption scheme, such as a form of Digital Rights Management (DRM) encryption. The device processor may then send the encrypted content to the companion device in block 424.

In response to determining that the capabilities of the companion device to prevent redistribution of the content do not meet the threshold (i.e., determination block 420="No"), the device processor may prevent access by the companion device to the content in block 426. For example, the device processor may block transmission of the content to the companion device and/or ignore requests from the companion device for the content. In some embodiments, the device processor may send a notification, such as an error message, to the companion device notifying the companion device that access to the content is blocked or denied.

Thus, the various embodiments enable the receiver device to selectively redistribute the content in an encrypted state if such content protections are required. By selectively encrypting content, the receiver device may protect high-value content from unauthorized copying or redistribution while only expending the processing resources and delaying content delivery when necessary.

Figure 5:
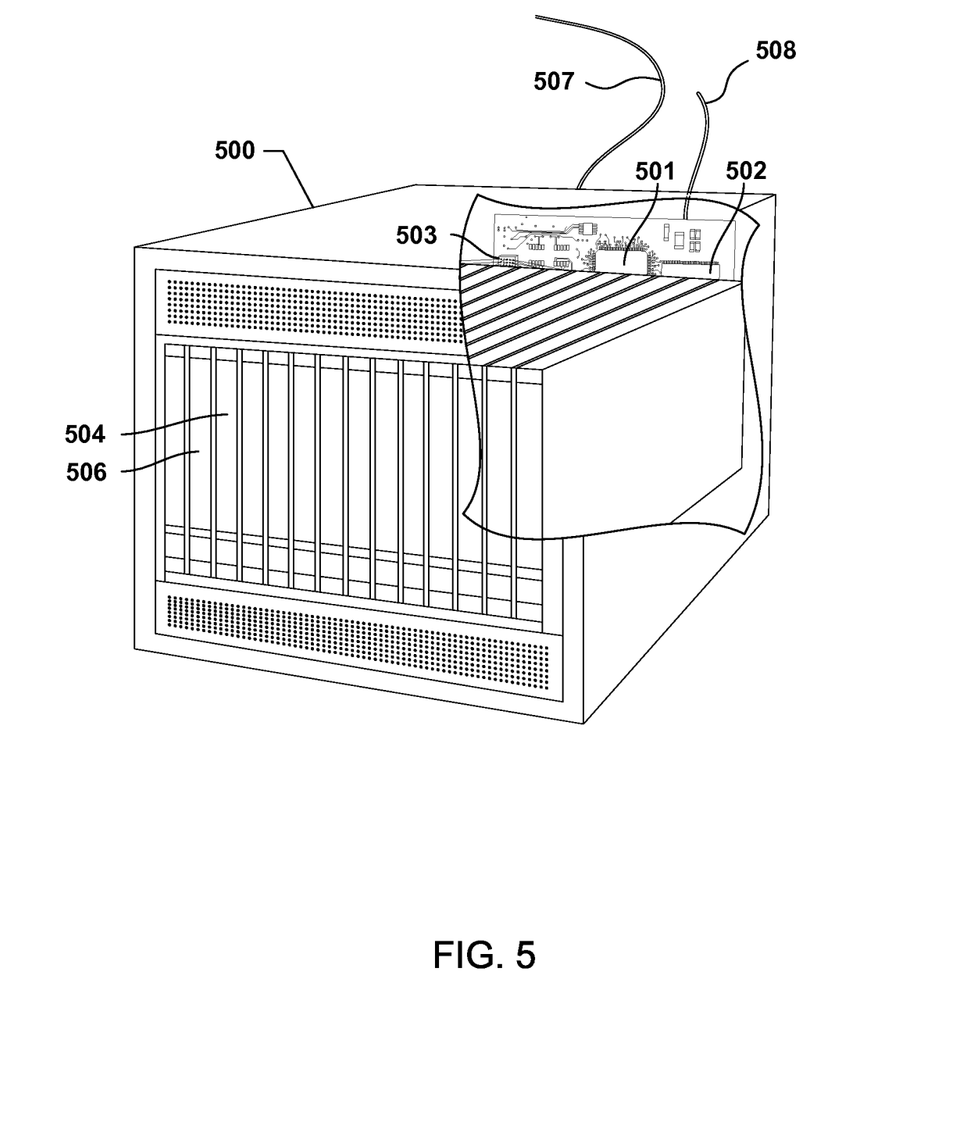
FIG. 5 is a component diagram of an example receiver device suitable for use with various embodiments.

Various embodiments (including, but not limited to, embodiments described with reference to FIGS. 1-4) may also be implemented on any of a variety of receiver devices, an example of which (e.g., receiver device 500) is illustrated in FIG. 5. With reference to FIGS. 1-5, the receiver device 500 typically includes a processor 501 coupled to volatile memory 502, and may also include and a large capacity nonvolatile memory, such as a disk drive 504. The receiver device 500 may also include a floppy disc drive, compact disc (CD) or DVD disc drive 506 coupled to the processor 501. The receiver device 500 may also include network communication ports 503 coupled to the processor 501 for, among other things, establishing network interface connections 507 with a communication network (such as a local area network coupled to other broadcast system computers and servers, a wide area network, a content data network, the public switched telephone network, and/or a cellular data network (e.g., CDMA, TDMA, GSM, PCS, 3G, 4G, LTE, or any other type of cellular data network). The receiver device may also include output ports 508 for providing content to a companion device, and/or providing content to an output device, such as a display and/or a speaker.

Figure 6:
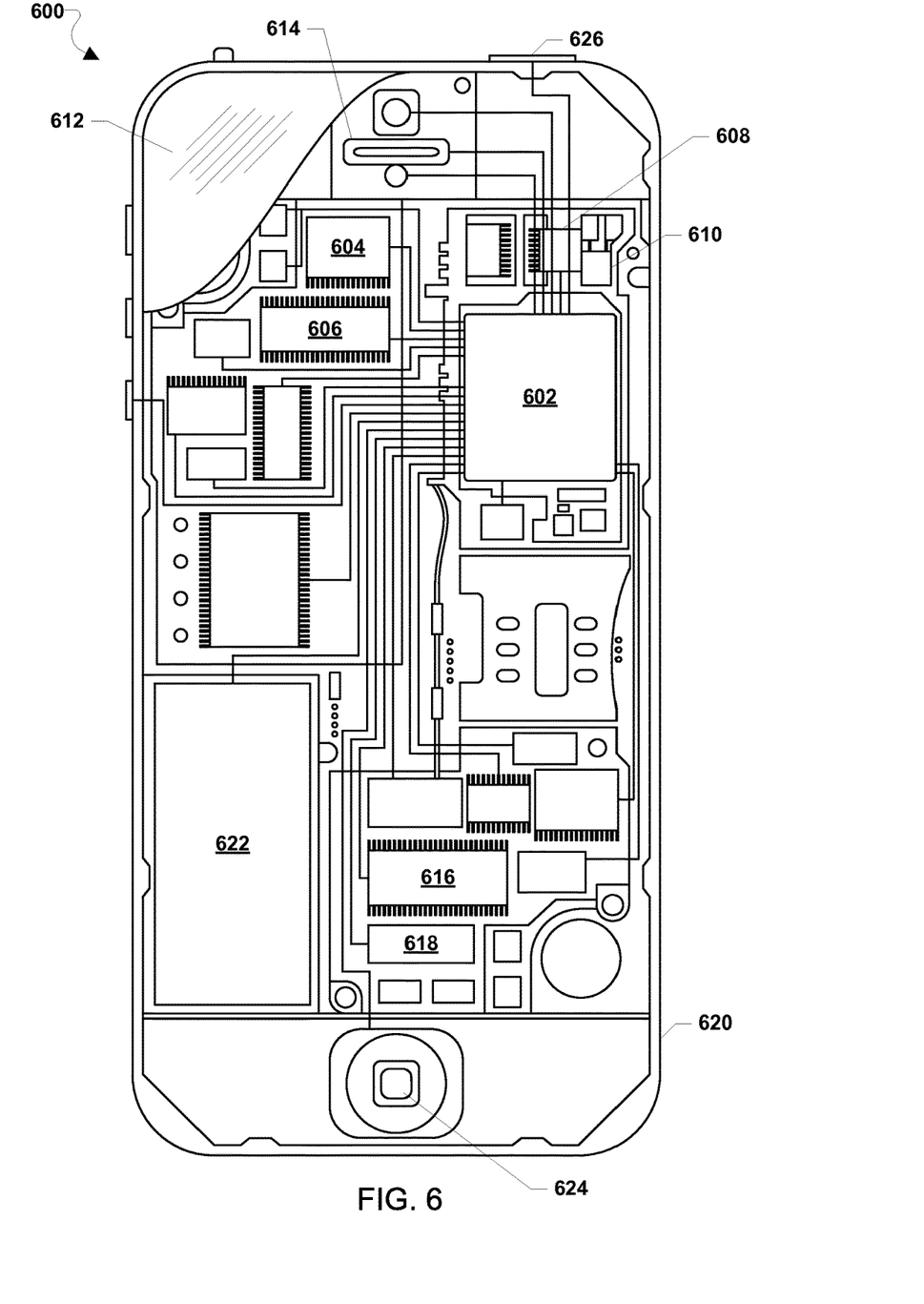
FIG. 6 is a component diagram of an example companion device suitable for use with various embodiments.

Various embodiments (including, but not limited to, embodiments described with reference to FIGS. 1-4) may be implemented in any of a variety of companion devices, an example of which (e.g., companion device 600) is illustrated in FIG. 6. With reference to FIGS. 1-4 and 6, the companion device 600 may include a processor 602 coupled to internal memories 604 and 606. Internal memories 604 and 606 may be volatile or non-volatile memories, and may also be secure and/or encrypted memories, or unsecure and/or unencrypted memories, or any combination thereof. The processor 602 may also be coupled to a touch screen display 612, such as a resistive-sensing touch screen, capacitive-sensing touch screen infrared sensing touch screen, or the like. Additionally, the display of the companion device 600 need not have touch screen capability. The companion device 600 may have one or more radio signal transceivers 608 (e.g., Peanut®, Bluetooth®, ZigBee®, Wi-Fi, RF radio) and antennae 610, for sending and receiving, coupled to each other and/or to the processor 602. The companion device 600 may include a cellular network interface, such as wireless modem chip 616, that enables communication via a cellular data network (e.g., CDMA, TDMA, GSM, PCS, 3G, 4G, LTE, ATSC 3.0, DVB-T2 or any other type of cellular or broadcast data network) and is coupled to the processor 602. The companion device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port. The companion device 600 may also include speakers 614 for providing audio outputs. The companion device 600 may also include a housing 620, constructed of a plastic, metal, or a combination of materials, for containing all or some of the components discussed herein. The companion device 600 may include a power source 622 coupled to the processor 602, such as a disposable or rechargeable battery. The rechargeable battery may also be coupled to the peripheral device connection port to receive a charging current from a source external to the companion device 600. The companion device 600 may also include a physical button 624 for receiving user inputs. The companion device 600 may also include a power button 626 for turning the companion device 600 on and off.

The processors 501 and 602 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 504, 506, 604, 606, before they are accessed and loaded into the processors 501 and 602. The processors 501 and 602 may include internal memory sufficient to store the application software instructions. In many devices the internal memory may be a volatile or nonvolatile memory, such as flash memory, or a mixture of both. For the purposes of this description, a general reference to memory refers to memory accessible by the processors 501 and 602 including internal memory or removable memory plugged into the device and memory within the processor 501 and 602 themselves.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or a non-transitory processor-readable storage medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use various embodiments. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for selectively encrypting content for distribution from a receiver device to a companion device, comprising:
    determining whether content received by the receiver device is encrypted, including:
        determining whether out-of-band signaling regarding the content is received; and
        determining whether the out-of-band signaling indicates that the content is encrypted in response to determining that the out-of-band signaling is received;
    determining whether capabilities of the companion device meet a threshold in response to determining that the content received by the receiver device is not encrypted;
    selecting to encrypt the content received by the receiver device in response to determining that the capabilities of the companion device meet the threshold; and
    sending the selectively encrypted content to the companion device.

2. The method of claim 1, wherein selecting to encrypt the content received by the receiver device comprises selecting to encrypt the content received by the receiver device using a content-layer encryption scheme.

3. The method of claim 1, further comprising:
    sending the content to the companion device in response to determining that the out-of-band signaling indicates the content is encrypted.

4. The method of claim 1, further comprising:
    delaying transmission of the content to the companion device in response to determining that the out-of-band signaling indicates the content is not encrypted; and
    inspecting the content for encryption.

5. The method of claim 1, further comprising:
    determining that the content received by the receiver device is encrypted before determining whether the capabilities of the companion device meet the threshold; and
    sending the content received by the receiver device to the companion device in response to determining that the content is encrypted.

6. The method of claim 1, wherein determining whether the capabilities of the companion device meet the threshold comprises determining whether the capabilities of the companion device to prevent redistribution of the content meet the threshold.

7. The method of claim 1, further comprising:
    preventing access by the companion device to the content received by the receiver device in response to determining that the capabilities of the companion device do not meet the threshold.

8. A receiver device, comprising:
    a memory;
    a network interface configured to receive content from a communication network;
    a communication interface configured to communicate with a companion device; and
    a processor coupled to the memory, the network interface and the communication interface, and configured with processor executable instructions to perform operations comprising:
        determining whether the content received by the receiver device is encrypted, including:
            determining whether out-of-band signaling regarding the content is received; and
            determining whether the out-of-band signaling indicates that the content is encrypted in response to determining that the out-of-band signaling is received;
        determining whether capabilities of the companion device meet a threshold in response to determining that the content received by the receiver device is not encrypted;
        selecting to encrypt the content received by the receiver device in response to determining that the capabilities of the companion device meet the threshold; and
        sending the selectively encrypted content to the companion device.

9. The receiver device of claim 8, wherein the processor is configured with processor executable instructions to perform operations such that selecting to encrypt the content received by the receiver device comprises selecting to encrypt the content received by the receiver device using a content-layer encryption scheme.

10. The receiver device of claim 8, wherein the processor is configured with processor executable instructions to perform operations further comprising:
    sending the content to the companion device in response to determining that the out-of-band signaling indicates the content is encrypted.

11. The receiver device of claim 8, wherein the processor is configured with processor executable instructions to perform operations further comprising:
    delaying transmission of the content to the companion device in response to determining that the out-of-band signaling indicates the content is not encrypted; and
    inspecting the content for encryption.

12. The receiver device of claim 8, wherein the processor is configured with processor executable instructions to perform operations further comprising:
    determining that the content received by the receiver device is encrypted before determining whether the capabilities of the companion device meet the threshold; and
    sending the content received by the receiver device to the companion device in response to determining that the content is encrypted.

13. The receiver device of claim 8, wherein the processor is configured with processor executable instructions to perform operations such that determining whether the capabilities of the companion device meet the threshold comprises determining whether the capabilities of the companion device to prevent redistribution of the content meet the threshold.

14. The receiver device of claim 8, wherein the processor is configured with processor executable instructions to perform operations further comprising:
    preventing access by the companion device to the content received by the receiver device in response to determining that the capabilities of the companion device do not meet the threshold.

15. A receiver device, comprising:
    means for determining whether content received by the receiver device is encrypted, including:
        means for determining whether out-of-band signaling regarding the content is received; and means for determining whether the out-of-band signaling indicates that the content is encrypted in response to determining that the out-of-band signaling is received;
means for determining whether capabilities of a companion device meet a threshold in response to determining that the content received by the receiver device is not encrypted;
means for selecting to encrypt the content received by the receiver device in response to determining that the capabilities of the companion device meet the threshold; and
means for sending the selectively encrypted content to the companion device.

16. The receiver device of claim 15, wherein means for selecting to encrypt the content received by the receiver device comprises means for selecting to encrypt the content received by the receiver device using a content-layer encryption scheme.

17. The receiver device of claim 15, further comprising:
means for sending the content to the companion device in response to determining that the out-of-band signaling indicates the content is encrypted.

18. The receiver device of claim 15, further comprising:
means for determining that the content received by the receiver device is encrypted; and
means for sending the content received by the receiver device to the companion device in response to determining that the content is encrypted.

19. The receiver device of claim 17, further comprising:
means for delaying transmission of the content to the companion device in response to determining that the out-of-band signaling indicates the content is not encrypted;
means for inspecting the content for encryption;
means for determining based on inspecting the content whether the content is encrypted; and
means for sending the content to the companion device in response to determining that the content is encrypted.

20. The receiver device of claim 15, wherein means for determining whether the capabilities of the companion device meet the threshold comprises:
means for determining the capabilities of the companion device to prevent redistribution of the content in response to determining that the content is not encrypted.

21. The receiver device of claim 20, further comprising:
means for preventing access by the companion device to the content received by the receiver device in response to determining that the capabilities of the companion device do not meet the threshold.

22. A non-transitory processor-readable storage medium having stored thereon processor-executable instructions configured to cause a processor of a receiver device to perform operations comprising:
determining whether content received by the receiver device is encrypted, including:
determining whether out-of-band signaling regarding the content is received; and
determining whether the out-of-band signaling indicates that the content is encrypted in response to determining that the out-of-band signaling is received;
determining whether capabilities of a companion device meet a threshold in response to determining that the content received by the receiver device is not encrypted;
selecting to encrypt the content received by the receiver device in response to determining that the capabilities of the companion device meet the threshold; and
sending the selectively encrypted content to the companion device.

23. The non-transitory processor-readable storage medium of claim 22, wherein the stored processor-executable instructions are configured to cause the processor of the receiver device to perform operations such that selecting to encrypt the content received by the receiver device comprises encrypting the content received by the receiver device using a content-layer encryption scheme.

24. The non-transitory processor-readable storage medium of claim 22, wherein the stored processor-executable instructions are configured to cause a processor of the receiver device to perform operations further comprising:
sending the content to the companion device in response to determining that the out-of-band signaling indicates the content is encrypted.

25. The non-transitory processor-readable storage medium of claim 22, wherein the stored processor-executable instructions are configured to cause the processor of the receiver device to perform operations further comprising:
determining that the content received by the receiver device is encrypted before determining whether the capabilities of the companion device meet the threshold; and
sending the content received by the receiver device to the companion device in response to determining that the content is encrypted.

26. The non-transitory processor-readable storage medium of claim 24, wherein the stored processor-executable instructions are configured to cause the processor of the receiver device to perform operations further comprising:
delaying transmission of the content to the companion device in response to determining that the out-of-band signaling indicates the content is not encrypted;
inspecting the content for encryption;
determining based on inspecting the content whether the content is encrypted; and
sending the content to the companion device in response to determining that the content is encrypted.

27. The non-transitory processor-readable storage medium of claim 22, wherein the stored processor-executable instructions are configured to cause the processor of the receiver device to perform operations such that determining whether the capabilities of the companion device meet the threshold comprises:
determining the capabilities of the companion device to prevent redistribution of the content in response to determining that the content is not encrypted.

28. The non-transitory processor-readable storage medium of claim 22, wherein the stored processor-executable instructions are configured to cause the processor of the receiver device to perform operations further comprising:
preventing access by the companion device to the content received by the receiver device in response to determining that the capabilities of the companion device do not meet the threshold.

* * * * *